United States Patent [19]

Fang

[11] Patent Number: 4,799,217

[45] Date of Patent: Jan. 17, 1989

[54] THREE TIME SLOT DIGITAL SUBSCRIBER LINE TERMINATION

[75] Inventor: Rong-Chin Fang, North Andover, Mass.

[73] Assignee: American Telephone and Telegraph Company, AT&T Bell Laboratories, Murray Hill, N.J.

[21] Appl. No.: 898,697

[22] Filed: Aug. 20, 1986

[51] Int. Cl.[4] .......................... H04Q 11/04; H04J 3/06
[52] U.S. Cl. ..................................... 370/68.1; 370/100
[58] Field of Search ..................... 370/68.1, 110.1, 100, 370/68

[56] References Cited

U.S. PATENT DOCUMENTS

| | | | |
|---|---|---|---|
| 3,502,810 | 3/1970 | Aaron et al. | 178/68 |
| 4,587,514 | 5/1986 | Schas et al. | 340/347 |
| 4,747,098 | 5/1988 | Huang et al. | 370/110.1 |
| 4,757,501 | 7/1988 | Gorshe | 370/110.1 |

Primary Examiner—Douglas W. Olms
Assistant Examiner—Frank M. Scutch, III
Attorney, Agent, or Firm—Thomas Stafford

[57] ABSTRACT

A channel unit is disclosed for interfacing a digital subscriber line (DS1) to a PCM digital transmission facility, for example, T carrier. The basic rate interface (BRI) 2B+D format is converted to a unique three time slot format for transmission in the DS1 PCM signal format. The two communication B channels are interrogated to determine if they have a logical 0 in each bit position, i.e., zero byte. If so, a non all logical 0 bit pattern is substituted and a logical 1 indication bit is inserted in an associated bit position in a control channel. In a receiver, the associated indicator bit positions in the control channel are interrogated to determine if an all logical 0 bit pattern, i.e., a zero byte, had been replaced. If so, an all logical 0 bit pattern is inserted in the associated communication channel. A logical 1 is inserted in bit position 2 of the control channel to negate the possibility of emulating a T carrier yellow alarm condition. A logical 1 is also inserted in bit position 3 of the control channel to satisfy the logical 1's density requirement for digital transmission facilities.

29 Claims, 5 Drawing Sheets

THREE TIME SLOT DIGITAL SUBSCRIBER LINE TERMINATION

TECHNICAL FIELD

The present invention is directed toward digital transmission systems and, more particularly, to a digital subscriber line termination.

BACKGROUND OF THE INVENTION

A digital subscriber line basic rate interface (BRI) format has evolved that includes two communication transmission channels, designated B channels, and one signaling channel, designated the D channel, which may also be used to transmit customer data in a packet format. This format is commonly referred to as the 2B+D digital subscriber line format. In one example, the B channels are each 64 kbit/sec and the D channel is 16 kbit/sec. The B channels may be advantageously used to transmit text, pictures, and data, as well as speech. Consequently, the communication channels may include all logical 0's for one or more time slots. The D channel is used to transmit signaling information for the B channels.

As presently implemented, the digital subscriber line transmission distance is somewhat limited. Therefore, in order to provide service to subscribers located beyond the limited distance from an integrated services digital network (ISDN) switching office, other transmission facilities must be employed. Such facilities may include, for example, T1 carrier digital transmission lines.

As is well known, any PCM channel having all logical 0's for one or more time slots violates the logical 1's density requirement for repeaters in digital transmission lines. Additionally, all logical 0's in more than a predetermined number of consecutive channels, i.e. time slots, would cause an erroneous yellow alarm condition in T carrier systems. These conditions are undesirable and cannot be tolerated.

Prior known arrangements detect whether a channel, i.e. time slot, includes all logical 0's and insert a predetermined non-all logical 0 bit pattern in the particular channel. The fact that a substitution has been made is transmitted by causing a pre-established bipolar violation sequence. The bipolar violation sequence is detected at a receiver, and the logical 0's are reinserted in all the bit positions of the corresponding channel.

The problem with such arrangements is that the bipolar violation sequence is lost in the digital transmission hierarchy, because the bipolar digital signals are converted to unipolar form prior to multiplexing to a higher digital rate in the hierarchy. Consequently, conversion from the bipolar violation scheme to some other arrangement is required at each multiplexer in order to communicate that a channel includes all logical 0's.

SUMMARY OF THE INVENTION

Problems associated with transmitting the basic rate digital subscriber line signal on T carrier or other transmission facilities in the digital transmission hierarchy are overcome, in accordance with an aspect of the invention, by employing a unique digital signal format, including at least one communication channel, i.e., time slot, and an associated control channel, i.e., time slot. The associated control channel includes at least one bit position for transmitting an indication of whether or not an associated at least one communication channel includes a predetermined logical signal, for example a logical 0, in all bit positions. The associated at least one communication channel is interrogated to determine if it includes a predetermined bit pattern having the predetermined logical signal in all bit positions, i.e., a logical 0 in each bit position and, if so, the predetermined bit pattern is replaced with a prescribed bit pattern having a logical signal other than said predetermined logical signal, for example a logical 1, in at least one predetermined bit position. Additionally, a corresponding indication signal, e.g., a logical 1, is inserted in an associated bit position in the control channel. Upon reception, the at least one indication bit in the control channel is interrogated and, if it so indicates, all logical 0's are inserted in the associated communication channel.

In a specific embodiment, the predetermined bit pattern is replaced by a prescribed bit pattern having a logical 1 in the least significant bit position.

Additionally, a predetermined logical signal, e.g., a logical 1, is inserted in a predetermined one of the control channel bit positions to negate the possibility of transmitting an erroneous yellow alarm indication. A logical 1 is also inserted in another predetermined bit position of the control channel to negate the possibility of the control channel including logical 0's in all the bit positions. Another at least one bit position in the control channel is used to transmit signaling information for the associated at least one communication channel.

In a specific implementation, the 2B+D digital subscriber line format is converted, in accordance with an aspect of the invention, into a so-called three (3) time slot format for transmission over a T carrier facility or other digital transmission facilities in the hierarchy. Three time slots are employed to transmit two B communication channels and a control channel designated D+. The D+ control channel includes two zero-byte indicator bits, each of which is associated with a particular B communication channel, a yellow alarm bit position, a 1's density bit, two D channel signaling bits, a maintenance bit, and a maintenance framing bit. If one or both of the B communication channels includes all logical 0's, a predetermined non all-zero byte, is inserted in the particular B communication channel and a logical 1 is inserted in the associated zero-byte indication bit in the D+ control channel. Upon reception, the zero-byte indication bits are interrogated to determine if they are logical 1's and, if so, a zero-byte is inserted in the associated B communication channel.

BRIEF DESCRIPTION OF THE DRAWING

The invention will be more fully understood from the following detailed description of an illustrative embodiment taken in connection with the appended figures in which.

DETAILED DESCRIPTION

Figure 1:
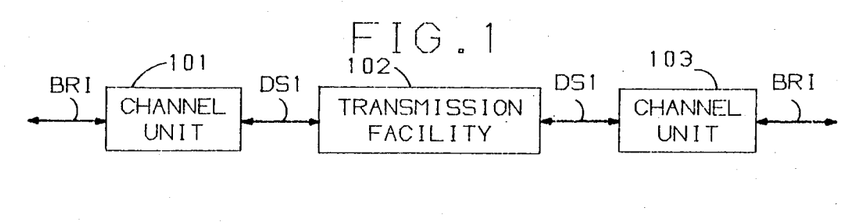
FIG. 1 shows, in simplified block diagram form, a transmission arrangement in which the present invention may be utilized.

FIG. 1 shows in simplified block diagram form a transmission arrangement employing an embodiment of the invention. Accordingly, shown are channel unit 101 which is used, in accordance with an aspect of the invention, for interfacing a digital subscriber line which usually transmits the basic rate interface (BRI) signal to the well known DS1 transmission signal for transmission via transmission facility 102 to a remote channel unit 103. Channel units 101 and 103 are identical in implementation and are intended for use in a digital channel bank. Such digital channel banks are now well known in the art, see for example, an article entitled "The Channel Bank", BSTJ, Vol. 61, No. 9, November 1982, pages 2611-2664. It is to be understood, however, that the channel bank itself constitutes no part of the present invention and it will be apparent to those skilled in the art that the inventive concepts may be used with other and different channel banks or digital terminals. It is noted that each of channel units 101 and 103 includes both a transmit unit for converting the BRI signal to the DS1 signal and a receive unit for converting the DS1 signal to the BRI signal. These transmit and receive units are described hereinafter.

Figure 2:
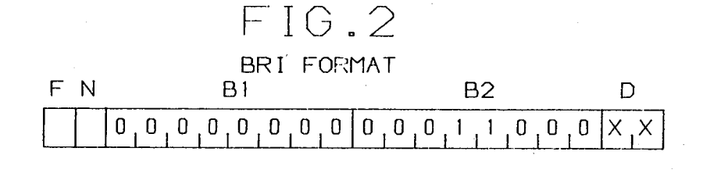
FIG. 2 illustrates the basic rate interface (BRI) digital subscriber line format.

FIG. 2 illustrates the typical known BRI signal format, commonly referred to as the 2B+D format. Accordingly, shown are a framing bit position, F, a maintenance bit position, N, a first communication channel, B1 including eight (8) bit positions, a second communication channel, B2, also including eight (8) bit positions and a signaling channel, D, including two (2) bit positions, which are time shared between the B1 and B2 communication channels. As shown, communication channel B1 includes an all zero byte and communication channel B2 includes a non-all zero byte.

Figure 3:
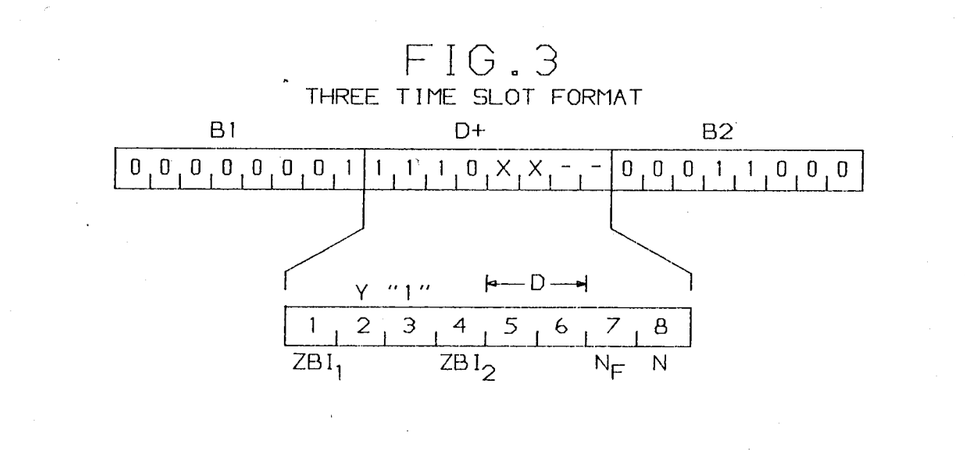
FIG. 3 depicts the three time slot digital format of the invention.

FIG. 3 shows a three time slot format, in accordance with an aspect of the invention. Although the present invention is being described in the context of the 2B+D basic subscriber line format, it is to be understood that a subscriber may purchase a single communication channel and a control channel, e.g., either B1 or B2 and D+ or any combination thereof if so desired. As shown the three time slot format includes one time slot for one communication channel, B1 including 8 bit positions, i.e., a byte, another time slot for a second communication channel, B2, also including 8 bit positions and a time slot for a control channel, D+, also including 8 bit positions. It should also be understood that the arrangement of the B1 and B2 communication channels and control channel D+ is not critical and they may be arranged in any desired order in the three time slot format of the invention. Control channel D+ includes two zero byte indicator (ZBI) bit positions, i.e., $ZBI_1$ corresponding to communication channel B1 and $ZBI_2$ corresponding to communication channel B2, a yellow alarm bit position (Y), a 1's density position (1), two signaling bit positions (D channel), a maintenance channel (N) bit position and a maintenance channel framing ($N_F$) bit position. There is no specific requirement for which positions in the D+ control channel that the particular bits are in, except that a logical 1 is inserted in bit position 2. This insertion of a logical 1 in bit position 2 prevents the three time slot format from emulating a so-called yellow alarm condition in T-carrier transmission facilities. The other bit positions of control channel D+ in this example are as follows: bit position 1 is the $ZBI_1$ which corresponds to communication channel B1 (BRI FIG. 2). Since communication channel B1 from the subscriber line, in this example, includes an all zero byte, a non-all zero bit pattern is inserted in the corresponding time slot in the three time slot format and a logical 1 is inserted in the $ZBI_1$ bit position. In this example, the non-all zero byte includes a logical 1 in the least significant bit position. This minimizes the impact on the subscriber data if the $ZBI_1$ logical 1 signal indicating a substitution is lost in transmission. It may be determined that other non-all zero byte bit patterns may also be employed. For example, the next to least significant bit being a logical 1 may be equally advantageously employed. Bit position 4 is the $ZBI_2$ which corresponds to communication channel B2. Since communication channel B2 from the subscriber line (BRI FIG. 2), in this example, includes a non-all zero byte, it is not modified and a logical 0 is inserted in the $ZBI_2$ bit position. The signaling bits XX from the D channel are inserted in bit positions 5 and 6. The maintenance information bit N is inserted in bit position 8 while a corresponding maintenance framing bit $N_F$ is inserted in bit position 7. The $N_F$ framing pattern is 1111111000000. A logical 1 is inserted in bit position 3 to insure that the 1's density requirement for T-Carrier transmission facilities is not violated. The $ZBI_1$ and $ZBI_2$ bits are used in a remote receiver to determine whether communication channels B1 and B2, respectively, have been modified to include non-zero bytes and, if so, an all zero byte is inserted therefore.

Figure 4:
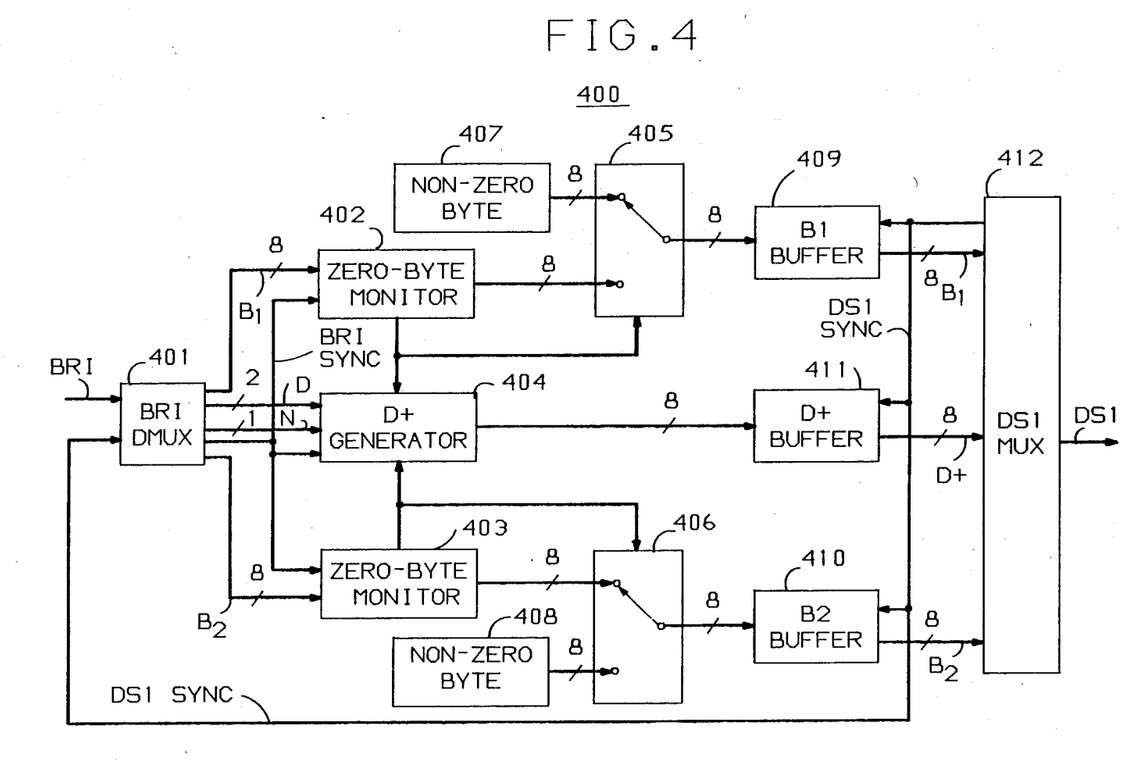
FIG. 4 shows, in simplified block diagram form, a transmission unit for converting the BRI format to the three time slot format of the invention employed in the channel units of FIG. 1.

FIG. 4 shows in simplified block diagram form details of transmitter unit 400 which is used in channel units 101 and 103 of FIG. 1 to convert the BRI signal, in accordance with an aspect of the invention, to the three time slot format PCM signal for transmission in the DS1 digital signal format over T-carrier or other digital transmission facilities. Accordingly, shown is BRI demultiplexer (DMUX) 401 which simply demultiplexes the BRI format of FIG. 2 to yield separate digital signals including communication channel B1, communication channel B2, the signaling channel D and the maintenance channel N. BRI DMUX 401 also generates a BRI SYNC signal which is derived in well known fashion from the incoming BRI signal framing bit and the DS1 SYNC signal from DS1 MUX 412 so that the BRI SYNC signal is in phase with the DS1 SYNC signal. To this end, it will be apparent to those skilled in the art that BRI DMUX 401 includes framing, timing recovery and other like circuitry (not shown) for interfacing the digital subscriber line. It is noted that the BRI signal is transmitted at a 160 kbit/sec rate over the digital subscriber line. The 8 bit communication channel B1 is supplied in parallel to zero-byte monitor 402. Similarly, the 8 bit communication channel B2 is supplied in parallel to zero-byte monitor 403. The 2 bits of signaling channel D are supplied in parallel to D+ generator 404. The 1 bit maintenance channel N is also supplied to D+ generator 404. The BRI SYNC signal is at an 8 kHz rate and is supplied to zero-byte monitor 402, zero-byte monitor 403 and D+ generator 404 to ensure that the three time slot format being generated includes a BRI frame. Zero-byte monitor 402 compares the bits in communication channels B1 to determine if they are all logical 0's. If so, a logical 1 is supplied to D+ generator 404 and to controllable switch 405. If not, a logical 0 is supplied to D+ generator 404 and to controllable switch 405. In this example, communication channel B1 includes an all zero byte and, consequently, a logical 1 is supplied to D+ generator 404 to be inserted in $ZBI_1$ in bit position 1 of control channel D+ (FIG. 3). The logical 1 from zero-byte monitor 402 also causes switch 405 to connect non-zero byte unit 407 to B1 buffer 409. Non-zero byte unit 407 is a register that includes a predetermined non-all zero byte as shown in communication channel B1 of FIG. 3. Thus, a predetermined non-all zero byte is supplied from zero byte unit 407 via switch 405 as an output communication channel to B1 buffer 409. If communication channel B1 had not included an all zero byte, the information in the B1 communication channel would have been supplied via switch 405 as an output communication channel to B1 buffer 409. Zero byte monitor 403, controllable switch 406 and non-zero byte unit 408 function in identical fashion as zero-byte monitor 402, controllable switch 405 and non-zero byte unit 407, respectively. In this example, communication channel B2 in the BRI signal (FIG. 2) includes a non-all zero byte. Consequently, zero byte monitor 403 supplies a logical 0 to D+ generator 404 to be inserted in $ZBI_2$ in bit position 4 of control channel D+ (FIG. 3). The logical 0 is also supplied to controllable switch 406 which, consequently, remains in its normal position of connecting zero-byte monitor 403 to B2 buffer 410. Therefore, the non-zero byte of communication channel B2 is supplied via switch 406 as an output communication channel for temporary storage in B2 buffer 410. Again, if communication channel B2 included an all zero byte, zero-byte monitor 403 would generate a logical 1 for insertion into the corresponding $ZBI_2$ bit position in the D+ channel and switch 406 would connect non-zero byte unit 408 to B2 buffer 410. Unit 408 would supply the predetermined non-zero byte as an output communication channel to B2 buffer 410. D+ generator 404 generates the D+ control channel as shown in FIG. 3. As indicated above the positioning of the bits in the D+ control channel is not critical, except that a logical 1 be inserted in bit position 2 to prevent emulating a yellow alarm condition. Thus, in this example, a logical 1 is inserted in the $ZBI_1$ bit position in control channel D+ which indicates that communication channel B1 includes an all zero byte, a logical 1 is inserted in bit position 2 for the yellow alarm condition, a logical 1 is inserted in bit position 3 for the 1's density condition, the D channel signaling bits XX are inserted in bit positions 5 and 6, the maintenance channel framing bit $N_F$ is inserted in bit position 7 and the maintenance channel bit N is inserted in bit position 8. Again, it is noted that the signaling bits are time shared between communication channel B1 and communication channel B2. The 8 bit D+ control channel is supplied in parallel to D+ buffer 411. DS1 multiplexer (MUX) 412 is supplied with the 8 bit byte of communication channel B1 from B1 buffer 409, the 8 bit byte of communication channel B2 from B2 buffer 410 and the 8 bit byte of control channel D+ from D+ buffer 411, all in parallel. DS1 MUX 412 supplies a DS1 SYNC signal to B1 buffer 409, B2 buffer 410 and D+ buffer 411 to insure that the respective bytes are supplied in synchronism to the DS1 digital signal. DS1 SYNC is also supplied to BRI DMUX 401 to insure that BRI SYNC is in phase therewith. The DS1 SYNC is also at an 8 kbit/sec rate. DS1 MUX 412 forms the three time slot format, in accordance with an aspect of the invention, as shown in FIG. 3, which is to be transmitted in the DS1 signal. It will be apparent to those skilled in the art that DS1 MUX 412 includes framing, timing and other like circuitry (not shown) for interfacing with, in this example, a T carrier transmission facility. It is noted that the DS1 signal is transmitted at a 1.544 mbit/sec rate over a T carrier transmission facility.

Figure 5:
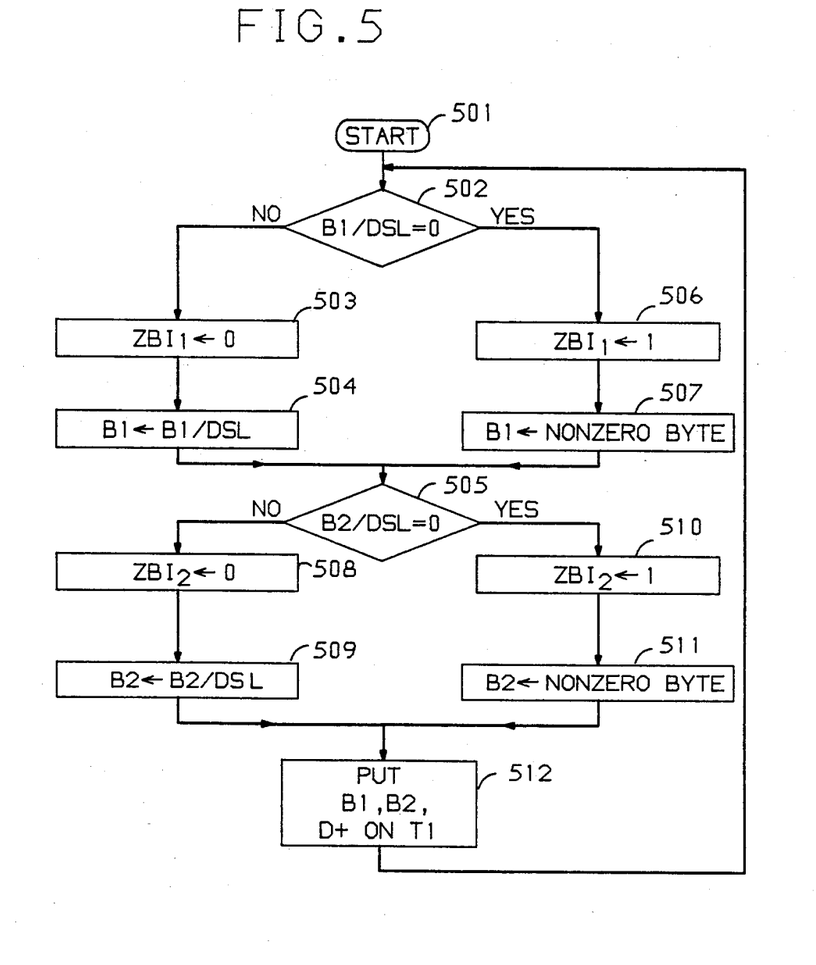
FIG. 5 is a flow chart illustrating operation of the transmitter unit of FIG. 4.

FIG. 5 shows in flow chart form the operation of the transmitter unit 400 of FIG. 4, in accordance with the invention. Accordingly, operation is started via step 501. Thereafter, conditional branch point 502 tests to determine if communication channel B1 from the digital subscriber line (DSL) includes an all zero byte, i.e., B1/DSL=0. If not, block 503 causes a logical 0 to be inserted into the $ZBI_1$ 1 bit position in control channel D+ and block 504 causes the byte in communication channel B1 from the DSL to be supplied via switch 405 to B1 buffer 409. If the test result in step 502 is YES, block 506 causes a logical 1 to be inserted in the $ZBI_1$ bit position of control channel D+ and block 507 causes a non-all zero byte of information as shown in FIG. 3 to be supplied from non-zero byte unit 407 via switch 405 to B1 buffer 409. Conditional branch point 505 and blocks 508 through 511 perform identical operations for communication channel B2 as described above for communication channel B1. Thereafter, block 512 causes the B1 byte, B2 byte and D+ byte to be multiplexed via DS1 MUX 412 onto a T carrier transmission facility in the DS1 format.

Figure 6:
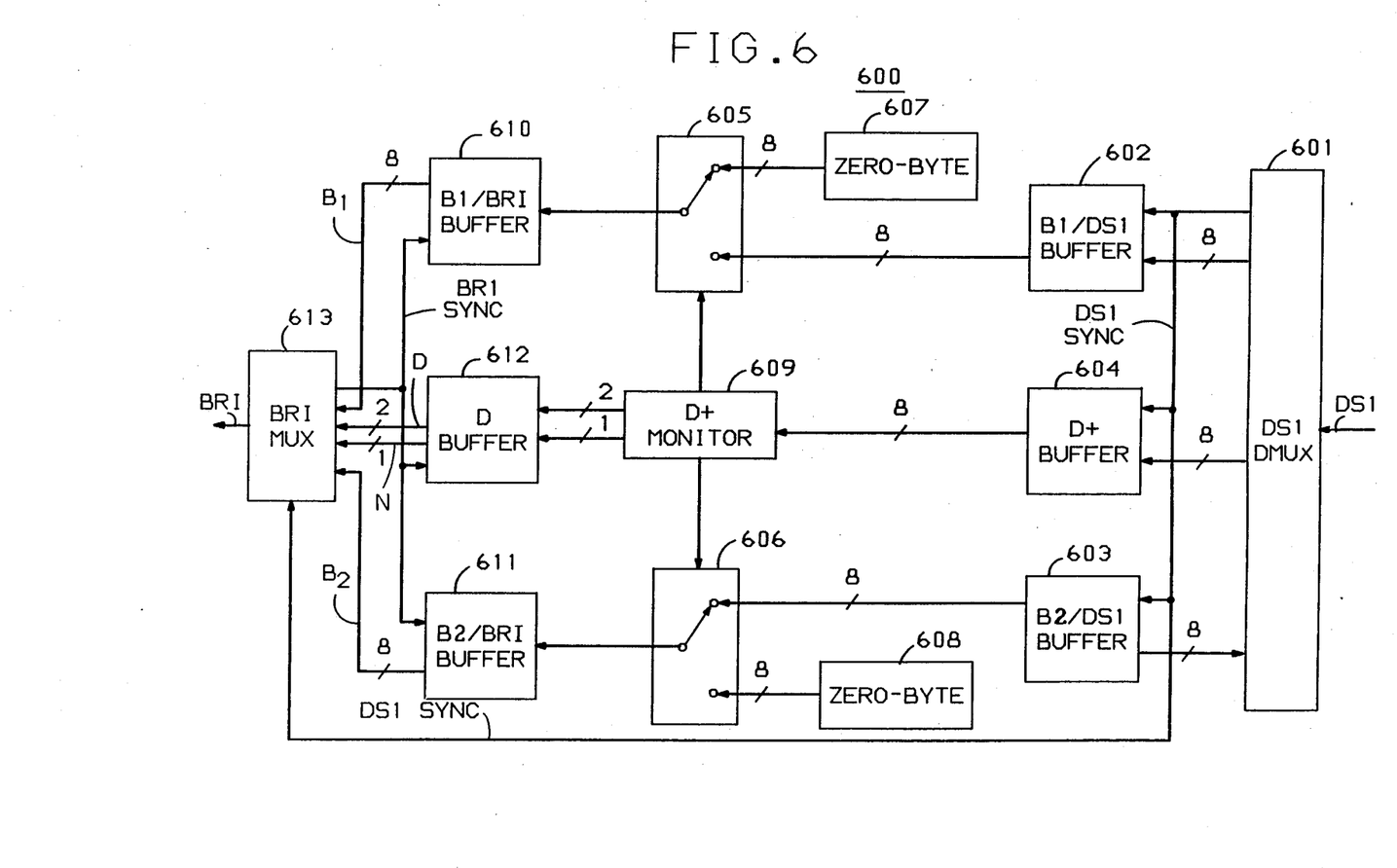
FIG. 6 shows, in simplified block diagram form, a receiver unit for converting the three time slot format of the invention to the BRI format.

FIG. 6 shows in simplified block diagram form details of a receiver unit which is used in channel units 101 and 103 of FIG. 1 to convert, in accordance with an aspect of the invention, the three time slot format in the DS1 signal to the digital subscriber line BRI format. Accordingly, shown is DS1 demultiplexer (DMUX) 601 which demultiplexes the three time slot format shown in FIG. 3 and supplies the 8 bit byte of communication channel B1 in parallel to B1/DS1 buffer 602, the 8 bit byte of communication channel B2 in parallel to B2/DS1 buffer 603 and the 8 bit byte of control channel D+ to D+ buffer 604. DS1 DMUX 601 supplies a DS1 SYNC signal to each of B1/DS1 buffer 602, B2/DS1 buffer 603, D+ buffer 604 and BRI MUX 613 to insure synchronism with the incoming DS1 signal. Again, the DS1 SYNC is at an 8 kbit/sec rate. It will be apparent to those skilled in the art that DS1 DMUX 601 includes framing, timing recovery and like circuitry (not shown) for interfacing with, in this example, a T carrier transmission facility. B1/DS1 buffer 602 is connected to controllable switch 605, B2/DS1 buffer 603 is connected to controllable switch 606 and D+ buffer 604 is connected to D+ monitor 609. D+ monitor 609 interrogates the $ZBI_1$ and $ZBI_2$ bit positions 1 and 4, respectively, of control channel D+ to determine whether the associated communication channels B1 and B2, respectively, include an all zero byte. A logical 1 in the $ZBI_1$ or $ZBI_2$ bit position indicates that the associated communication channel includes an all zero byte. A logical 0 in the ZBI bit position indicates that the associated communication channel includes a non-all zero byte. Thus, if the $ZBI_1$ bit position includes a logical 1, a logical 1 is supplied from D+ monitor 609 to controllable switch 605. In turn, switch 605 supplies an all zero byte from zero-byte unit 607 to B1/BRI buffer 610. On the other hand, if the $ZBI_1$ bit position includes a logical 0, a logical 0 is supplied from D+ monitor 609 to switch 605. In turn, switch 605 would be in its normal position of supplying the contents of B1/DS1 buffer 602 to B1/BRI buffer 610. D+ monitor 609 operates in identical fashion in interrogating the $ZBI_2$ bit position of control channel D+ to operate controllable switch 606 for supplying the information byte from B2/DS1 buffer 603 to B2/BRI buffer 611 when the $ZBI_2$ bit position in control channel D+ is a logical 0 and the all zero-byte from zero-byte unit 608 when the $ZBI_2$ bit position in control channel D+ is a logical 1. D+ monitor 609 also supplies the 2 bit D channel and the one bit N channel to D buffer 612. B1/BRI buffer 610, B2/BRI buffer 611 and D buffer 612 are all connected to BRI multiplexer (MUX) 613. BRI MUX 613 generates a BRI SYNC signal which is in phase with the DS1 SYNC signal from DS1 DMUX 601. The BRI SYNC signal is supplied to each of B1/BRI buffer 610, B2/BRI buffer 611 and D buffer 612 to synchronize them to the BRI subscriber line signal. Again the BRI SYNC is at the 8 kbit/sec rate which is in phase with DS1 SYNC. It will also be apparent to those skilled in the art that BRI MUX 613 includes framing, timing and like circuitry (not shown) for interfacing with the digital subscriber line. Accordingly, the contents of B1/BRI buffer 610, B2/BRI buffer 611 and D buffer 612 are supplied in parallel to BRI MUX 613 which forms the 2B+D BRI signal format as shown in FIG. 2 for transmission at the 160 kbit/sec rate. Again, in this example, communication channel B1 is shown to include an all zero byte and communication channel B2 is shown to include a non-all zero byte.

Figure 7:
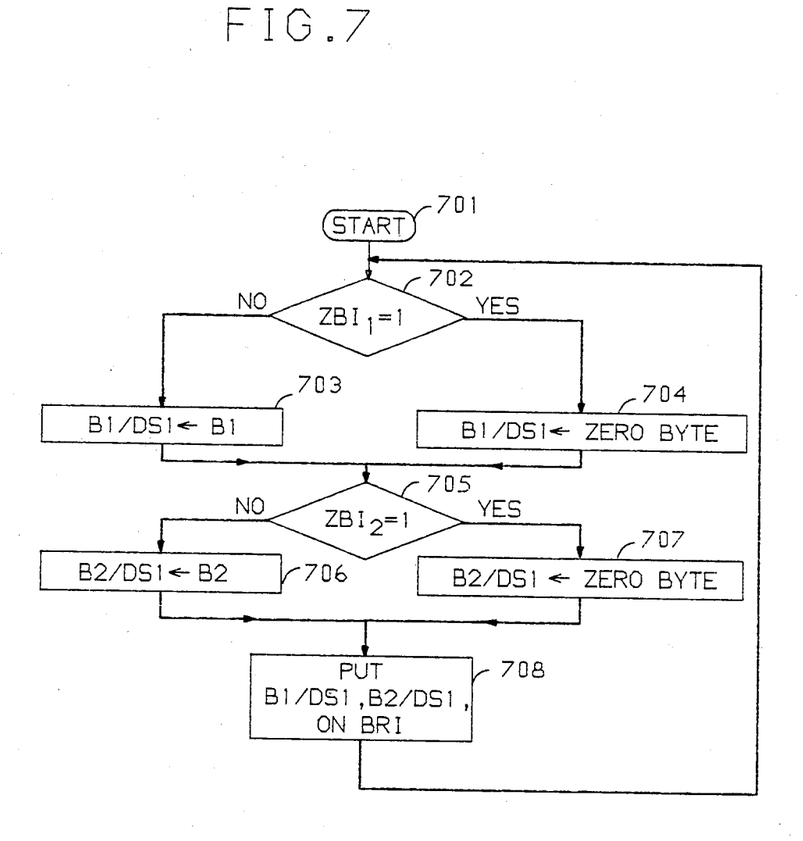
FIG. 7 is a flow chart illustrating operation of the receiver of FIG. 6.

FIG. 7 shows in flow chart form the operation of the receiver unit 600 of FIG. 6, in accordance with the invention. Accordingly operation is started via step 701. Thereafter, conditional branch point 702 causes D+ monitor 609 to interrogate $ZBI_1$, to determine if communication channel B1 includes an all zero byte. If not, block 703 causes the contents of B1/DS1 buffer 602 to be supplied via switch 605 to B1/BRI buffer 610. If the test result in step 702 is YES, communication channel B1 includes an all zero byte and block 704 causes an all zero byte from zero byte unit 607 to be supplied via switch 605 to B1/BRI buffer 610. Conditional branch point 705 and blocks 706 and 707 perform identical operations for communication channel B2 as described above for communication channel B1. Thereafter, block 708 causes the B1/DS1 and B2/DS1 bytes as well as the D channel and maintenance channel to be outputted in the BRI 2B+D format for transmission on a digital subscriber line.

What is claimed is:

1. Apparatus for interfacing a digital subscriber line of the type having a digital transmission format including at least one communication channel, comprising:
    means for interrogating logical signals in bit positions of said at least one communication channel, said interrogating means generates an output signal indicating whether or not a predetermined bit pattern is present in said at least one communication channel having a first predetermined logical signal in all bit positions,
    means responsive to said output signal from said interrogating means for controllably replacing said predetermined bit pattern in said at least one communication channel with a prescribed bit pattern having a logical signal other than said first predetermined logical signal in at least one bit position when said output signal indicates that said predetermined bit pattern is present and for yielding an at least one output communication channel,
    means for generating a control channel having a plurality of bit positions, said means for generating being responsive to said output signal from said interrogating means for inserting a second predetermined logical signal into a first predetermined bit position of said control channel to indicate whether or not said predetermined bit pattern was replaced, and
    means for combining said at least one output communication channel and said control channel for transmission over a digital transmission facility.

2. The apparatus as defined in claim 1 wherein said first predetermined logical signal being interrogated for by said means for interrogating is a logical 0.

3. The apparatus as defined in claim 1 wherein said prescribed bit pattern includes a logical 1 in at least one predetermined bit position.

4. The apparatus as defined in claim 3 wherein said at least one predetermined bit position in said prescribed bit pattern is the least significant bit position.

5. The apparatus as defined in claim 1 wherein said second predetermined logical signal inserted in said first predetermined bit position of said control channel by said means for generating is a first logical state when said predetermined bit pattern has been replaced by said prescribed bit pattern and a second logical state when said predetermined bit pattern has not been replaced.

6. The apparatus as defined in claim 5 wherein said digital subscriber line signal format further includes a signaling channel having a plurality of bit positions and wherein said means for generating said control channel inserts bits from said plurality of signaling channel bit positions into predetermined bit positions in said control channel.

7. The apparatus as defined in claim 6 wherein said means for generating said control channel generates said control channel having a predetermined logical signal in a second predetermined bit position to negate the possibility of emulating a yellow alarm condition for DS1 PCM transmission.

8. The apparatus as defined in claim 7 wherein said predetermined logical signal in said second predetermined bit position is a logical 1.

9. The apparatus as defined in claim 7 wherein said means for generating said control channel further generates said control channel having a predetermined logical signal in a third predetermined bit position to satisfy the logical 1's density requirement for T carrier digital transmission.

10. The apparatus as defined in claim 9 wherein said predetermined logical signal in said third predetermined bit position is a logical 1.

11. The apparatus as defined in claim 9 wherein said means for combining combines said at least one output communication channel and said control for transmission in a DS1 PCM signal format.

12. Apparatus for interfacing a received signal in a prescribed digital format to a digital subscriber transmission line signal format, comprising,
    means for demultiplexing at least one communication channel and a control channel from said received signal prescribed digital format,
    means for interrogating at least one predetermined bit position of said control channel, said interrogating means generating an output signal indicating that a predetermined bit pattern having a first predetermined logical signal in all bit positions was replaced by a prescribed bit pattern having a logical signal other than said predetermined logical signal in at least one predetermined bit position in said at least one communication channel for transmission, and means responsive to said output signal from said interrogating means for replacing said prescribed bit pattern in said at least one communication channel with said predetermined bit pattern.

13. The apparatus as defined in claim 12 wherein said prescribed bit pattern includes a logical 1 in at least one predetermined bit position.

14. The apparatus as defined in claim 13 wherein said at least one predetermined bit position in said prescribed bit pattern is the least significant bit position.

15. The apparatus as defined in claim 12 wherein said predetermined bit position in said control channel is interrogated by said interrogating means for a logical 1 signal indicating that said predetermined bit pattern had been replaced by said prescribed bit pattern and wherein said interrogating means generates a logical 1 output signal indicative thereof.

16. Apparatus for interfacing a digital subscriber line of the type having a digital transmission format including at least first and second communication channels and a signaling channel, comprising, first means for interrogating logical signals in bit positions of said first communication channel, said first interrogating means generates a first output signal indicating whether or not a predetermined bit pattern is present in said first communication channel having a first predetermined logical signal in all bit positions, means responsive to said first output signal for controllably replacing said predetermined bit pattern in said first communication channel with a prescribed bit pattern having a logical signal other than said first predetermined logical signal in at lest one bit position when said first output signal indicates that said predetermined bit pattern is present and for yielding a first output communicating channel, second means for interrogating logical signals in bit positions of said second communication channel, said second interrogating means generates a second output signal indicating whether or not a predetermined bit pattern is present in said second communication channel having a first predetermined logical signal in all bit positions, means responsive to said second output signal for controllably replacing said predetermined bit pattern in said second communication channel prescribed bit pattern having a logical signal other than said first predetermined logical signal in at least one bit position when said second output signal indicates that said predetermined bit pattern is present and for yielding a second output communication channel, means for generating a control channel having a plurality of bit positions, said means for generating being responsive to said first and second output signals for inserting a second predetermined logical signal into first and second predetermined bit positions, respectively, of said control channel to indicate whether or not said predetermined bit pattern was replaced in said first and second communication channels, respectively, and means for combining said first and second output communication channels and said control channel for transmission over a digital transmission facility.

17. The apparatus as defined in claim 16 wherein said first predetermined logical signal being interrogated for by said first and second and second means for interrogating is a logical 0.

18. The apparatus as defined in claim 16 wherein said prescribed bit pattern includes a logical 1 in at least one predetermined bit position.

19. The apparatus as defined in claim 18 wherein said at least one predetermined bit position in said prescribed bit pattern is the least significant bit position.

20. The apparatus as defined in claim 16 wherein said second predetermined logical signal to be inserted in said first and second predetermined bit positions of said control channel by said means for generating is a first logical state when said predetermined bit pattern has been replaced by said prescribed bit pattern and a second logical state when said predetermined bit pattern has not been replaced.

21. The apparatus as defined in claim 20 wherein said digital subscriber line signal format further includes a signaling channel having a plurality of bit positions and wherein said means for generating said control channel inserts bits from said plurality of signaling channel bit positions into predetermined bit positions in said control channel.

22. The apparatus as defined in claim 21 wherein said means for generating said control channel generates said control channel having a logical 1 signal in a third predetermined bit position to negate the possibility of emulating a yellow alarm condition for DS1 PCM transmission.

23. The apparatus as defined in claim 22 wherein said means for generating said control channel further generates said control channel having a logical 1 signal in a fourth predetermined bit position to satisfy the logical 1's density requirement for T carrier digital transmission.

24. The apparatus as defined in claim 23 wherein said means for combining combines said first and second output communication channels and said control channel for transmission in a DS1 PCM signal format.

25. Apparatus for interfacing a received signal in a PCM digital format to a digital subscriber transmission line signal format, comprising, means for demultiplexing first and second communication channels and a control channel from said received signal PCM digital format, first means for interrogating a first predetermined bit position of said control channel, said first interrogating means generating a first output signal indicating that a predetermined bit pattern having a first predetermined logical signal in all bit positions was replaced by a prescribed bit pattern having a logical signal other than said predetermined logical signal in at least one predetermined bit position in said first communication channel for transmission, means responsive to said first output signal for replacing said prescribed bit pattern in said first communication channel with said predetermined bit pattern, second means for interrogating a second predetermined bit position of said control channel, said second interrogating means generating a second output signal indicating that a predetermined bit pattern having a first predetermined logical signal in all bit positions was replaced by a prescribed bit pattern having a logical signal other than said predetermined logical signal in at least one predetermined bit position in said second communication channel for transmission, and means responsive to said second output signal for replacing said prescribed bit pattern in said second communication channel with said predetermined bit pattern.

26. The apparatus as defined in claim 25 wherein said prescribed bit pattern includes a logical 1 in at least one predetermined bit position.

27. The apparatus as defined in claim 26 wherein said at least one predetermined bit position in said prescribed bit pattern is the least significant bit position.

28. The apparatus as defined in claim 25 wherein said first and second predetermined bit positions in said control channel are interrogated by said first and second interrogating means, respectively, for a logical 1 signal indicating that said predetermined bit pattern had been replaced by said prescribed bit pattern and wherein said first interrogating means generates a logical 1 first output signal indicative that said predetermined bit pattern was replaced in said first communication channel and said second interrogating means generates a logical 1 second output signal indicative that said predetermined bit pattern was replaced in said second communication channel.

29. Apparatus for interfacing a digital subscriber line of the type having a digital transmission format including at least one communication channel, comprising, means for interrogating logical signals in bit positions of said at least one communication channel, said interrogating means generates an output signal indicating whether or not a predetermined bit pattern is present in said at least one communication channel having a first predetermined logical signal in all bit positions, means responsive to said output signal from said interrogating means for controllably replacing said predetermined bit pattern in said at least one communication channel with a prescribed bit pattern having a logical signal other than said first predetermined logical signal in at least one bit position when said output signal indicates that said predetermined bit pattern is present and for yielding an at least one output communication channel, means for generating a control channel having a plurality of bit positions said means for generating being responsive to said output signal from said interrogating means for inserting a second predetermined logical signal into a first predetermined bit position of said control channel to indicate whether or not said predetermined bit pattern was replaced, and means for combining said at least one output communication channel and said control channel for transmission over a digital transmission facility to a remote location, the remote location including apparatus for interfacing a received signal in a prescribed digital format to a digital subscriber transmission line signal format, comprising, means for demultiplexing at least one communication channel and a control channel from said received signal prescribed digital format, means for interrogating at least one predetermined bit position of said control channel, said interrogating means generating an output signal indicating that a predetermined bit pattern having a first predetermined logical signal in all bit positions was replaced by a prescribed bit pattern having a logical signal other than said predetermined logical signal in at least one predetermined bit position in said at least one communication channel for transmission, and means responsive to said output signal from said interrogating means for replacing said prescribed bit pattern in said at least one communication channel with said predetermined bit pattern.

* * * * *